FIG. I

United States Patent Office 3,799,764
Patented Mar. 26, 1974

3,799,764
ROASTING OF COPPER SULFIDE CONCENTRATES COMBINED WITH SOLID STATE SEGREGATION REDUCTION TO RECOVER COPPER
William R. Opie, Holmdel, and Lamar D. Coffin, Edison, N.J., assignors to American Metal Climax, Inc., New York, N.Y.
Filed Jan. 25, 1971, Ser. No. 109,244
Int. Cl. C22b 5/10, 15/00
U.S. Cl. 75—72
19 Claims

ABSTRACT OF THE DISCLOSURE

A method of upgrading copper recovery from copper-iron sulfide ore containing up to about 5% copper is provided comprising forming a sulfide concentrate containing at least about 15% copper from said ore, dead roasting the sulfide concentrate to produce a calcined concentrate in which the sulfur does not exceed about 1%, preferably does not exceed about 0.5% sulfur, subjecting the calcined concentrate to a controlled-reduction roast at an elevated reduction temperature with a reducing agent in the presence of an alkali metal halide, preferably a chloride such as NaCl, whereby copper oxide is selectively reduced, leaving the iron substantially all in the iron oxide form, the reduced copper metal being in a form recoverable by conventional separation procedures, such as mechanical or chemical methods.

---

Figure 1:
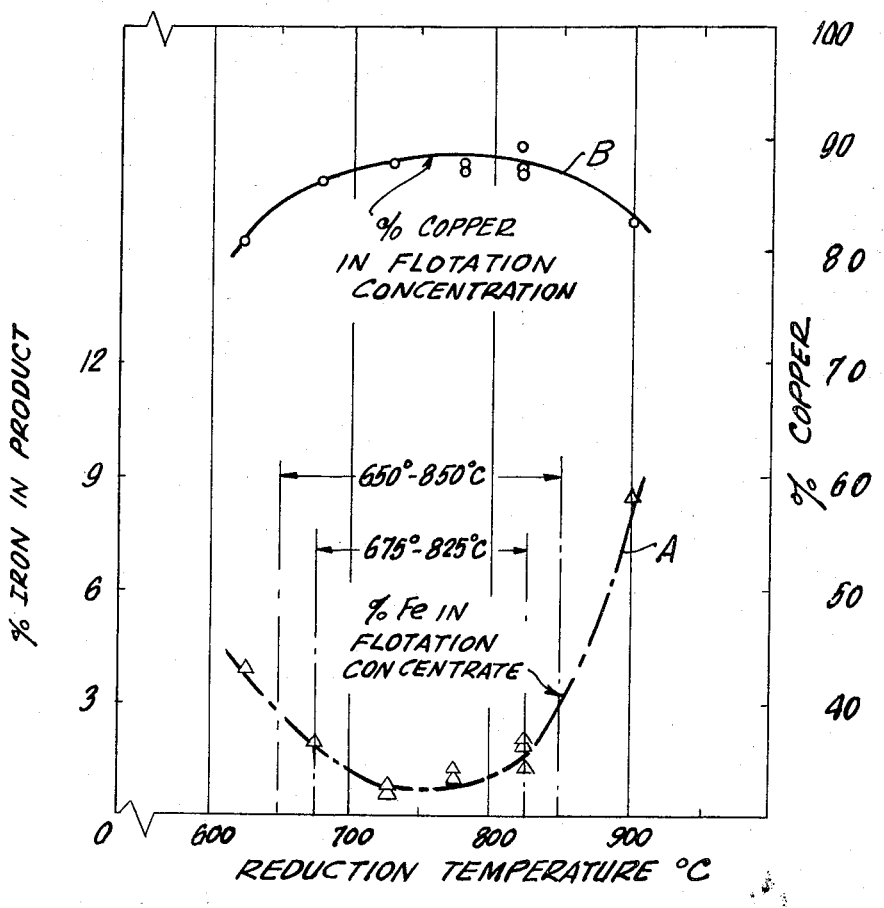

This invention relates to the metallurgy of copper and, more particularly, to a highly efficient method for recovering copper in the form of metallic copper from copper-iron sulfide ores by a solid state reduction process. The invention is particularly applicable to porphyry copper ores which contain chalcopyrite, bornite and mixtures thereof.

STATE OF THE ART

One conventional method for recovering copper from sulfide ores comprises forming a sulfide concentrate which is usually partially roasted to remove a part of the sulfur and then smelted in a reverberatory furnace to form a sulfide matte containing a still higher concentration of copper, the balance of the matte being substantially iron and sulfur. The reverberatory slag is generally very low in copper, e.g., up to 0.5% by weight. The matte in the liquid state is transferred to a converter to blow out the sulfur and to oxidize the iron which is taken up in an overlying slag along with other impurities. The remaining sulfur combined with the copper is then further oxidized out to form blister copper which is removed from the converter and transferred to an anode furnace where it is treated for casting into anodes for subsequent electrolytic refining.

In recent years, the foregoing process has met with disfavor by municipalities due to air pollution problems arising from effluent $SO_2$ gas which usually was discarded into the surrounding atmosphere. Attempts at reducing air pollution by converting $SO_2$ to sulfuric acid have not been too successful for economic reasons. For example, in the production of sulfuric acid by the absorption process, it is desirable for optimum efficiency that the effluent gas continuously contain at least about 7% by volume $SO_2$. This is difficult in the foregoing process in that the concentration of effluent $SO_2$ produced by the reverberatory furnace and the converter varies considerably during processing, whereby it is not conducive economically to the production of sulfuric acid.

Autogenous smelting of sulfide concentrates posed similar disadvantages. In this process, the concentrate is flash smelted (much as powdered coal is burned) to form a matte which is then treated in a converter to remove the iron and sulfur. However, during smelting, a slag is obtained which is quite rich in copper, for example, 1.5 to 2% by weight of copper, which requires further processing by either flotation or by electric furnace reduction to recover the copper. Thus, this process had certain economic limitations. Moreover, as much as 25% of the $SO_2$ formed was still emitted to the atmosphere in the form of dilute gases, unless high capital auxiliary equipment was used to avoid air pollution.

A process was proposed in the middle 1920's using a solid state reduction method of recovering copper from oxidic ores, such as crysocolla (copper silicate), cuprite and melaconite (copper oxide) and the like. This process, which was first described in U.S. Pat. No. 1,679,337, comprised mixing charcoal and a halogen material, e.g. sodium chloride, with the oxidic ore and then heating the mixture in a rotating furnace (e.g. a rotating retort) at a temperature ranging from about 500° C. to 700° C. to segregate out and reduce the copper from the ore. The method applied to flue dust containing 13% by weight of copper in the oxidized form produced reduced coalesced copper segregates having a ball-like shape with carbon nuclei therein, the segregates containing about 54% by weight of copper which could be separated from the treated charge by screening. The copper was generally thereafter recovered from the reduced concentrate by either acid or ammoniacal leaching to recover over 90% and up to about 97% of the copper. Unless otherwise indicated, all reference to percentages herein is understood to be percent by weight.

In Pat. No. 1,865,153, the segregation process was applied to an ore containing 6.2% copper of which 3.2% was in the natural oxidic form and 3% in the form of sulfide (mostly chalocite). In carrying out the process, the ore was first subjected to a sulfating roast at 650° C. for one hour and thereafter mixed with carbon and NaCl and heated at an elevated temperature to reduce out the copper. The reduced product was submitted to flotation to form a concentrate assaying about 58.7% copper and containing about 93.4% of the total copper. The method applied to two similar ores produced low grade copper concentrates after flotation containing 23.8% copper and 30.7% metallic copper, respectively. As is apparent, the foregoing treatment of ores containing mixed oxides and sulfides of copper do not provide highly enriched copper concentrates.

In the Report of Investigations No. 5501 (U.S. Bureau of Mines, 1959) entitled "Treating Oxidized and Mixed Oxide-Sulfide Copper Ores by the Segregation Process" (by Carl Rampacek, W. A. McKinney and P. T. Waddleton), a very detailed account is given of the segration-reduction process as applied to both oxidized ores and mixed oxide-sulfide ores. In treating ores containing 0.78 to 5% copper, flotation concentrates of these reduced copper ores ranged in metallic copper content from about 21 to 76% by weight, the copper recovery from the ore ranging from about 73 to 96%. It is stated on page 12 of the technical publication that the rougher concentrates from the better tests on different ores assayed 10 to 62% metallic copper, with cleaner concentrates ranging up to 76%. With respect to the mixed oxide-sulfide ores, the final metallic copper concentrates contained less than 30% copper, the copper recovery of the total present not exceeding about 90%.

A disadvantage of the foregoing process is in the recovery of the copper from the concentrate. In some instances, where acid leaching is used to dissolve out the metallic copper, the acid requirement may be too high due to the presence of acid-consuming ingredients in the ore, such as lime. Thus, on p. 10 of the aforementioned technical publication, it is noted that the acid leaching of a particular reduced ore required an uneconomical amount of 12.5 pounds of acid per pound of copper recovered.

As pointed out hereinabove, where the ore also contains copper as copper sulfide, it is difficult to obtain a highly enriched flotation concentrate following solid state reduction of the ore. It would be desirable, if possible, to apply the solid state reduction process to the recovery of copper from copper-iron sulfide ores containing up to about 5% copper.

With the discovery of relatively small and remotely located ore bodies containing copper-iron sulfide minerals, such as porphyry copper ores containing 0.4% to 1% of copper in the form of chalcopyrite and/or bornite, it has become increasingly desirable to develop a low capital cost process for upgrading the recovery of copper from such ores and produce a very high grade copper product low in iron from which the copper can subsequently be recovered relatively easily.

We have now discovered a method whereby a highly enriched copper product can be obtained from ores containing substantial amounts of iron while substantially inhibiting the iron from reporting in the copper product. While the copper can be recovered by any conventional means, a particular attribute of the product is that it can be directly melted into anode copper for the electrolytic refining thereof.

OBJECTS OF THE INVENTION

It is thus the object of this invention to provide a low cost method of recovering copper from copper-iron sulfide ores by solid state reduction.

Another object is to provide a process for upgrading the recovery of copper from relatively low grade ores containing copper-iron sulfide minerals.

It is a further object of the invention to provide an improved method of producing a very high grade copper concentrate rich in metallic copper from low grade sulfide ores, the copper being recoverable by simply melting the concentrate to form a copper-rich cast product capable of being electrolytically refined to pure copper.

An important aspect of the invention resides in the fact that any precious metals in the ore are capable of being substantially recovered along with the copper.

A still further object is to provide a method for recovering copper from copper-iron sulfide ores while at the same time produce an effluent gas enriched in $SO_2$ capable of being economically recovered in any desirable form, such as liquid $SO_2$, sulfuric acid or sulfur, and thereby avoid air pollution problems.

Figure 2:
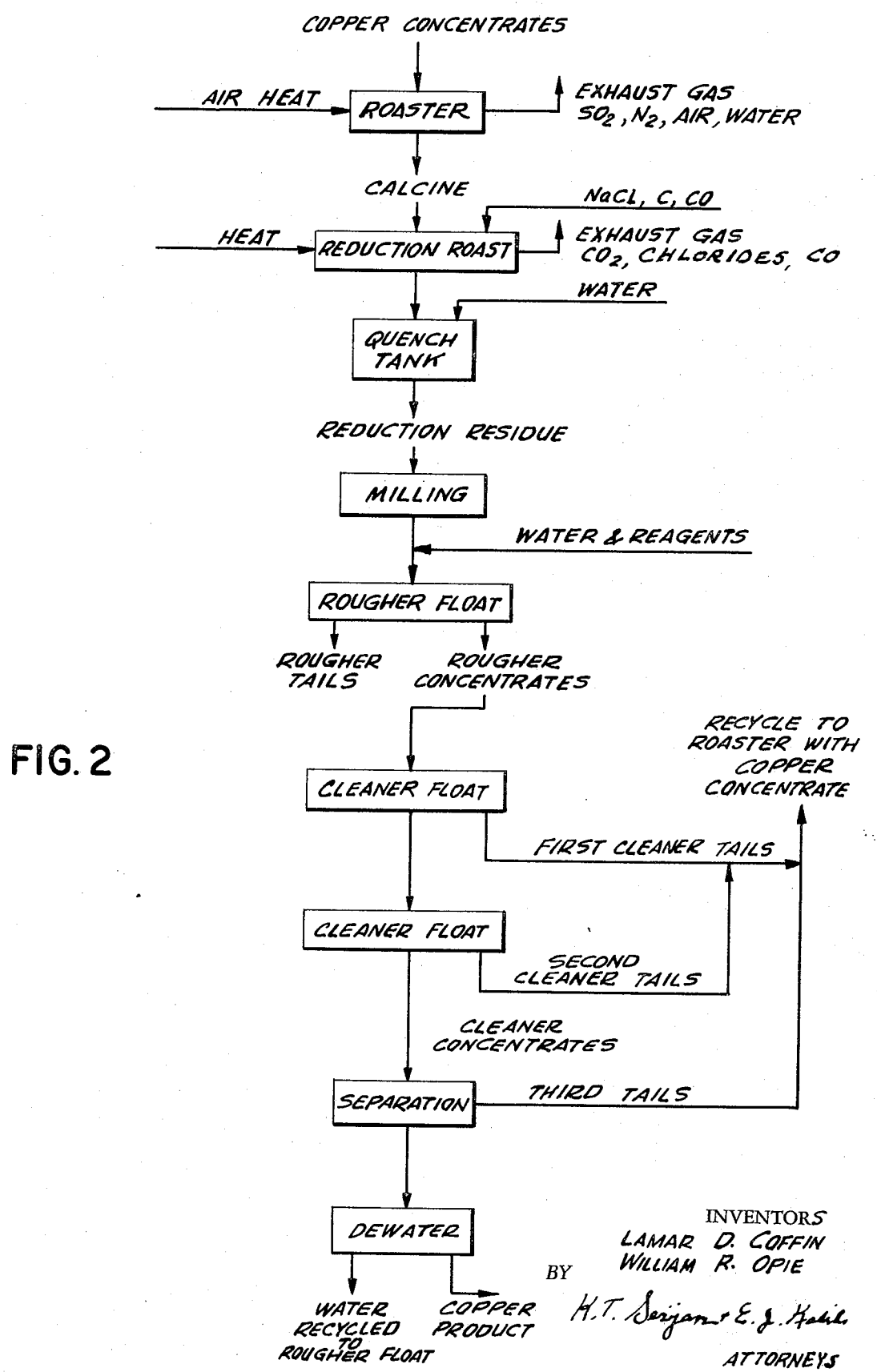

These and other objects will more clearly appear when taken in conjunction with the following disclosure and the accompanying drawings, wherein:

FIG. 1 is a plot showing the effect of the reduction temperature in the solid state reduction process on the retained iron content of the finally-produced metallic copper concentrate; and FIG. 2 is a flow sheet illustrating a preferred embodiment of the invention.

STATEMENT OF THE INVENTION

Stating it broadly, the invention resides in a method of upgrading copper recovery from copper-iron sulfide ores containing iron and containing up to about 5% copper by using a solid state reduction process in which the ore is first formed into a copper-iron sulfide concentrate containing at least about 15% copper and, preferably, at least about 20% copper, dead roasting the concentrate to remove substantially all of the sulfur to a level not exceeding 1%, subjecting the roasted concentrate to a controlled solid state reduction roast over a controlled elevated temperature range in the presence of a reducing agent and a small but effective amount of an alkali metal halide, for example, chlorides, such as sodium chloride, whereby the copper is selectively reduced to metallic copper and the iron left in the oxide form, the metallic copper being caused to agglomerate into discrete particles capable of being concentrated by conventional means, such as by gravity separation or flotation, to provide a highly enriched copper product containing over about 80% copper.

The highly enriched copper product is generally very low in iron and contains carbon (the reducing agent) as a contaminant which is capable of being easily burned off during melting of the product, any copper oxide present being reduced by the carbon. The cast product generally contains at least 98% copper and substantially all of the precious metals in the ore.

As will be apparent to those skilled in the art, other forms of halides or halogen materials may be employed to the extent that they behave similarly to alkali metal halides in carrying out the solid state reduction roast. In this connection, they are deemed to be equivalents.

The term "sulfide concentrate" is meant to include copper-iron sulfide concentrates, whether produced from ore by flotation or whether produced as a sulfide matte by smelting. The chief ingredients of a copper-iron sulfide concentrate or matte are copper, iron and sulfur. Copper may range from about 15% to 45%, preferably, 18% to 32%; iron from about 15% to 40%, more preferably, 20% to 35%; and sulfur from about 20% to 45%, more preferably, 25% to 40%; and the balance some gangue material, e.g. $SiO_2$, $Al_2O_3$, etc. The foregoing concentrates may contain small amounts of other ingredients, for example, Se, Te, Pb, Zn and such precious metals as Au, Ag, Pt, Pd and the like.

Examples of alkali metal halides are NaCl, KCl, LCl, NaI, KI, LiI, and the like.

By employing the invention on copper-iron sufide concentrates produced from ores containing up to 5% copper, anode grade copper can be produced without the necessity of leaching out the reduced metallic copper as is generally required by the aforementioned prior art solid state reduction processes. However, it will be understood that such conventional methods can be employed in recovering the copper. Concentrates containing 21.5% and 32% copper, respectively, have been treated in accordance with the invention to provide a highly enriched metallic copper concentrate capable of being directly melted into anode grade copper assaying over 98% copper. This attribute of the process is particularly advantageous in that it enables the recovery of copper as a high grade product in a relatively simple manner.

The metallic concentrate obtained by flotation from the reduced roasted concentrate is usually in excess of 80% copper and generally in excess of 85% copper, as compared to the much lower metallic concentrates obtained with the prior art solid state reduction methods disclosed hereinbefore. Moreover, the remainder of the product is mainly carbon and some copper oxide which are eliminated by simply melting the copper products. The overall recovery of copper is generally in excess of 95%, for example, 98% and higher, e.g. 99%+. Such substantially quantitative yields make the process particularly commercially attractive. In addition, very high yields of such gold and silver values as are contained in the ores are obtained with the copper, e.g. over about 95%.

Particularly advantageous results were obtained with two types of copper-iron sulfide concentrates, one containing 31.9% copper and the other containing 21.5% copper. The assays of these materials are as follows:

| | I | II |
|---|---|---|
| Element: | | |
| Cu, percent | 31.9 | 21.5 |
| Fe, percent | 25.4 | 31.9 |
| S, percent | 34.7 | 40.2 |
| SiO$_2$, percent | 6.1 | 4.1 |
| Al$_2$O$_3$, percent | 1.4 | 1.6 |
| Pb, percent | | 0.02 |
| Zn, percent | | 0.16 |
| Insol, percent | 7.7 | 3.9 |
| Ag, oz./ton | 1.8 | 2.4 |
| Au, oz./ton | 0.16 | 0.08 |

As will be noted, the total copper, iron and sulfur content of concentrate I is 92%, while for concentrate II, it is 93.6%.

PREFERRED EMBODIMENTS OF THE INVENTION

As illustrative of a preferred embodiment of the invention, the following broad example is given.

EXAMPLE 1

Each of the foregoing concentrates (I and II) was roasted in batches of 800 grams each in a quartz container for about 6 hours at 800° C. To assure uniform roasting, the batches were rabbled at 10 minute intervals, the batches being cooled after 3 hours roasting, mixed after screening through minus 30 mesh and the roasting continued for another 3 hours at 800° C. to complete the 6-hour cycle. The oxidizing roast was at least sufficient to assure conversion of substantially all of the iron sulfide to ferric oxide. The sulfur content after completion of the roast was 0.17% for concentrate I and 0.06% for concentrate II.

Each of the roasted concentrates in an amount of 650 grams was mixed with a desired amount of minus 60 mesh metallurgical coke (10%) and sodium chloride (2%) and charged into a fused quartz retort 30 inches long and 4 inches in diameter. The retort was provided with a CO atmosphere, placed in a muffle and and heated to a preferred temperature range of about 725° to 825° C. for periods ranging from 2 to 4 hours. During the holding period, the retort was rotated intermittently to assure complete reduction of copper while keeping substantially all of the iron in the oxide form and, upon completion of the run, the retort was removed from the muffle and allowed to cool to room temperature.

As a result of the solid state reduction roast, the copper was selectively reduced and, through a mechanism of chloride transport by virtue of the salt present (NaCl), was deposited on carbon nuclei where the copper grew to particles large enough, such as in the form of prills or coalesced aggregates of copper metal, to enable the easy recovery thereof. The carbon nuclei make up the major contaminant in the metallic product or concentrate which is preferably obtained by flotation, the carbon making up about 6% to 10% of the product.

Very satisfactory results were obtained with coke addition of about 10% and salt addition (NaCl) of about 2%. Reducing the salt addition to 1% based on the weight of the charge had no substantially adverse effect on the copper recovery from concentrate I. However, when the salt was completely withheld, a lower recovery of copper was noted following flotation. As regards concentrate II, satisfactory results were obtained when the coke was reduced to 7% of the charge and the salt to 1.5%. Tests indicated that it is preferred to employ carbon or coke at particle sizes less than 60 mesh for consistent high recoveries of copper.

Following the solid state reduction of the oxidized concentrate, the treated charge is dispersed in an aqueous medium and milled for about 3 minutes at a 50% solids content in a mill containing steel balls to effect liberation from the charge of the reduced copper aggregates or prills to prepare the mix for flotation. About 2 lbs./ton addition of CaO is made to the mill to provide a pH of 9.5 to 10.5 to promote selective flotation of the reduced copper. The milled charge is then placed in a flotation cell and diluted to a pulp density of about 25%. About 2 to 4 lbs./ton of a suitable flotation agent is added to promote frothing, as, for example, alkyl dithiophosphoric acid salts sold by American Cyanamid Co. under the trademark "Aerofloat 208," following which a rougher float is obtained with additions of a surface active agent, such as a water-soluble polyglycol. The rougher float or concentrate is cleaned several times by additional flotation and then recleaned by a series of decantation washings, such as wet classification. A relatively low grade cleaner tailing is obtainable by adding 0.5 lb./ton of the aforementioned "Aerofloat 208" during the first and second concentrate cleaning. As is well known to those skilled in the art, settling agents may be employed during decantation washing to lessen surface tension and improve the settling of reduced fine copper powder.

The cleaned concentrate obtained by flotation assayed consistently from about 85% to 89% copper as compared to much lower copper contents of corresponding metallic concentrates disclosed in the prior art. It was observed that the amount of iron remaining in the cleaned concentrate appeared to be related to the reduction temperature employed. For example, a 4-hour reduction treatment on copper sulfide concentrate I at 900° C. resulted in a residual iron content in the metallic concentrate of 8.8% as compared to a much lower value 0.83% by weight at a reduction temperature of 725° C. At reduction temperatures of 675° C. down to 625° C., the retained iron content ranged from 2.0% to 3.8%, thus indicating a minimum iron content at a reduction temperature of approximately 750° C., with the retained iron content increasing below this temperature and more markedly above this temperature, with a high retained iron content (8.8%) reached at about 900° C. (note FIG. 1).

DETAILED ASPECTS OF THE INVENTION

A series of tests was conducted on concentrate II in which the reduction temperature was varied over the temperature range of about 625° C. to 900° C. The treatment employed is similar to that of Example 1. The results are given in Tables I through III as follows:

TABLE I.—REDUCTION TREATMENT

| | Time, hours | Temp., ° C. | Carbon, percent | NaCl, percent |
|---|---|---|---|---|
| Example number: | | | | |
| 2 | 4 | 900 | 10 | 2 |
| 3 | 4 | 825 | 10 | 2 |
| 4 | 4 | 775 | 10 | 2 |
| 5 | 4 | 725 | 10 | 2 |
| 6 | 4 | 675 | 10 | 2 |
| 7 | 4 | 625 | 10 | 2 |
| 8 | 1 | 825 | 10 | 2 |
| 9 | 2 | 825 | 10 | 2 |
| 10 | 2 | 775 | 10 | 2 |
| 11 | 2 | 725 | 10 | 2 |

TABLE II.—FLOTATION PRODUCTS

| Ex. No. | Percent | | | Copper assay, percent | | |
|---|---|---|---|---|---|---|
| | Cleaned conc. | Cleaner tails [1] | Rougher tails | Cleaned conc. | Cleaner tails | Rougher tails |
| 2 | 49.6 | 9.3 | 41.1 | Cu—83.3<br>Fe—8.8<br>C—5.6 | 12.6 | 1.3 |
| 3 | 39.9 | 16.8 | 43.8 | Cu—89.9<br>Fe—2.15<br>C—5.85 | 30.6 | 0.21 |
| 4 | 44.1 | 11.1 | 44.8 | Cu—85.8<br>Fe—1.43<br>C—10.1 | 21.5 | 0.39 |
| 5 | 40.6 | 13.5 | 45.9 | Cu—87.4<br>Fe—0.83<br>C—9.58 | 31.6 | 0.64 |
| 6 | 36.3 | 28.5 | 35.2 | Cu—86.0<br>Fe—2.0<br>C—9.93 | 29.2 | 0.19 |
| 7 | 21.2 | 38.5 | 40.4 | Cu—80.2<br>Fe—3.8<br>C—12.5 | 40.4 | 15.4 |
| 8 | 42.4 | 21.0 | 36.6 | Cu—86.4<br>Fe—1.94<br>C—10.9 | 14.0 | 0.53 |
| 9 | 45.0 | 9.2 | 45.8 | Cu—86.3<br>Fe—1.42<br>C—10.8 | 15.4 | 0.37 |
| 10 | 43.7 | 12.3 | 44.0 | Cu—86.6<br>Fe—1.06<br>C—10.6 | 15.6 | 0.54 |
| 11 | 41.4 | 17.3 | 41.3 | Cu—87.5<br>Fe—0.78<br>C—9.6 | 19.7 | 0.98 |

[1] First, second and third cleaner tails combined.

TABLE III.—COPPER DISTRIBUTION, PERCENT

|  | Cleaned conc. | Cleaner tails | Rougher tails |
|---|---|---|---|
| Example number: |  |  |  |
| 2 | 96.0 | 2.7 | 1.3 |
| 3 | 87.6 | 12.2 | 0.2 |
| 4 | 93.7 | 5.8 | 0.5 |
| 5 | 88.7 | 10.6 | 0.7 |
| 6 | 78.8 | 21.0 | 0.2 |
| 7 | 43.7 | 40.2 | 16.1 |
| 8 | 92.1 | 7.4 | 0.5 |
| 9 | 96.1 | 3.5 | 0.4 |
| 10 | 94.6 | 4.8 | 0.6 |
| 11 | 90.9 | 8.5 | 0.6 |

As will be noted, at temperatures below 700° C., e.g. 675° C. and 625° C., the copper distribution or recovery falls off markedly (Table III), the percent copper distribution in Example 6 (675° C.) being less than 80% of the total (that is, 78.8%) and in Example 7 (625° C.) being extremely low (43.7%). When the sodium chloride was omitted, the percent copper recovery fell off and reached a low of 21.4% recovery in the cleaned concentrate reduced at 725° C. in the presence of 10% carbon. Decreasing the carbon content of the charge, e.g. to below 5%, had a significantly lowering effect on the amount of copper retained in the cleaned concentrate.

As stated hereinbefore, the reduction temperature appears to relate to the amount of iron retained in the cleaned concentrate. This will be apparent from Table II, the data of which are represented in FIG. 1. It will be noted that in the neighborhood of 750° C. (the valley of curve "A"), about less than 1% of iron is retained in the concentrate, while at 900° C. between 8 to 9% of iron is retained in the metallic concentrate after flotation and between 3 to 4% iron at 625° C. According to curve "A," it is preferred that the reduction temperature be controlled over the range of about 650° C. to 850° C. and, more preferably, from about 675° C. to 825° C. to assure metallic copper concentrates having a low iron content. Referring to curve "B" of FIG. 1, it will be noted that the percent metallic copper in the flotation concentrate reaches a peak in the neighborhood of about 88% at a reduction temperature of about 750° C., the concentrate falling off in copper as the temperature falls to 625° C. and also as the temperature rises to 900° C. The rougher tails usually contain less than 1% copper.

While the test results in Tables I to III are based on a once-through system of flotation recovery, a series of tests was conducted in which the combined cleaner tailings were recycled to either the roasting or reduction treatment. By continuously recycling the cleaner tailings in a closed loop operation, high total recovery of copper is assured of over 99%. Five recycles of the cleaner tailings to either the roasting or reduction treatment enabled a steady state to develop in which the rougher tailings averaged only 0.6 to 0.8% copper and in which the flotation metallic copper concentrate averaged 84%. In the fifth cycle, the results showed a falling off due to an increase of copper in the third cleaner tails. The product composite of five recycles of concentrate I after roasting, reduction and flotation is summarized in Tables IV and V, Table IV covering the recycle to the roasting treatment as follows:

TABLE IV.—RECYCLE TO REDUCTION TREATMENT

| Condition | Percent | Assay, percent Cu | Percent Cu distribution |
|---|---|---|---|
| Cleaned concentrates | 45.5 | 84.20 | 95.40 |
| 1st and 2d cleaner tails | 1.2 | 1.16 | 0.03 |
| 3d cleaner tails | 3.0 | 49.30 | 3.71 |
| Rougher tails | 50.3 | 0.69 | 0.86 |

TABLE V.—RECYCLE TO ROASTING TREATMENT

| Condition | Percent | Assay, percent Cu | Percent Cu distribution |
|---|---|---|---|
| Cleaned concentrates | 45.6 | 84.39 | 97.07 |
| 1st and 2d cleaner tails | 2.1 | 0.96 | 0.05 |
| 3d cleaner tails | 2.6 | 39.10 | 1.89 |
| Rougher tails | 49.7 | 0.79 | 0.99 |

It will be noted that the recycle to the roasting treatment (Table V) produces greater recovery or distribution of copper in the cleaned concentrates (97.07% Cu) than the recycle to the reduction treatment (Table IV) in which the recovery in the cleaned concentrates is 95.4%; however, in both instances, the cleaned concentrate, combined with the cleaner tails, provides an overall recovery of over 99% copper.

The flow sheet showing the steps of the process, including the recycle feature, is depicted in FIG. 2 which is self-explanatory.

Similar tests were conducted with concentrate II in which the copper content (21.5%) was much lower than that of concentrate I (31.9%). The results with this concentrate are depicted in Tables VI, VII and VIII as follows:

TABLE VI.—REDUCTION TREATMENT

|  | Time, hours | Temp., °C. | Carbon, percent | NaCl (percent) |
|---|---|---|---|---|
| Example number: |  |  |  |  |
| 12 | 2 | 775 | 7 | 1.5 |
| 13 | 2 | 825 | 7 | 1.5 |
| 14 | 2 | 825 | 7 | 1.5 |

TABLE VII.—FLOTATION PRODUCTS

|  | Percent of reduced concentrate | | | Copper assay (percent) | | |
|---|---|---|---|---|---|---|
|  | Cleaned conc. | Cleaner tails | Rougher tails | Cleaned conc. | Cleaner tails | Rougher tails |
| Example number: |  |  |  |  |  |  |
| 12 | 27.9 | 18.2 | 53.9 | Cu—88.4 / Fe—0.7 / C—9.2 | Cu—24.9 | Cu—0.94 |
| 13 | 31.6 | 13.8 | 54.6 | Cu—86.8 / Fe—0.9 / C—10.0 | Cu—14.6 | Cu—0.8 |
| 14 [1] | 30.9 | 13.3 | 55.8 | Cu—87.4 / Fe—1.6 / C—8.2 | Cu—14.9 | Cu—0.78 |

[1] Increasing the flotation reagent addition from 2 lb./ton in Example 13 to 3.5 lb./ton in Example 14 did not lower the level of copper in the rougher tailings.

TABLE VIII.—COPPER DISTRIBUTION, PERCENT

|  | Cleaned conc. | Cleaner tails | Rougher tails |
|---|---|---|---|
| Example number: |  |  |  |
| 12 | 83.0 | 15.2 | 1.7 |
| 13 | 91.8 | 6.7 | 1.5 |
| 14 | 91.7 | 6.8 | 1.5 |

As will be noted from Table VII, the iron content of the cleaned concentrate is less than 2% and averages, for the three examples, about 1.1%, while the average copper content is about 87.5%, which is very high considering that the copper sulfide concentrate prior to roasting contained 21.5% copper. This essentially metallic copper is suitable for being directly melted and cast as copper anode electrodes for electrolytic refining.

Another concentrate (III) was similarly tested. This concentrate contained 22% Cu, 29.4% Fe, 34.3% S, 5.59% Pb, 4.17% Zn and the balance essentially gangue. Because of the relatively large amount of lead and zinc present, the cleaned flotation concentrate contained about 66% to 71% copper, a good portion of the lead and zinc having been carried over with the copper during the segregation and reduction roasting. While such metallic concentrates can be melted and refined electrolytically, it is referred that reducible metals other than copper and iron not be present and, if present, not exceed a total amount of 5% of the copper-iron sulfide concentrate. However, a copper-nickel sulfide concentrate may be treated by the process where a copper-nickel alloy would be a desired end product.

As stated hereinbefore, a particular advantage of producing a high grade metallic concentrate by flotation is that it can be directly melted and cast into anode electrodes for electrolytic refining with very little slag formation, since a large part of the residuals is carbon, which is easily burned off. Examples of melted products produced from the treatment of concentrate I are given in Table IX as follows:

TABLE IX.—UPGRADING OF FLOTATION CONCENTRATE BY MELTING

| Example number: | Origin | Concentrate Before melting, percent Cu | Melted concentrate, percent Cu |
|---|---|---|---|
| 3 | I | 89.9 | 98.6 |
| 4 | I | 85.8 | 97.9 |
| 5 | I | 87.4 | 98.5 |
| 9 | I | 86.3 | 98.3 |
| 10 | I | 86.6 | 98.6 |

As will be observed, a particularly high grade of copper of over 95%, e.g., 98% and higher, is obtained merely by melting the flotation concentrate which renders it readily amenable to electrolytic refining. The metallic concentrates referred to herein with respect to the prior art solid state reduction method are not readily amenable to melting since they are of lower grade and contain a large amount of slag-forming constituents which tend to retain copper therein and must therefore be further treated to recover the copper present.

Another advantage of the invention is that any gold and silver present is favorably upgraded and recovered along with the copper. In the case of concentrate I, the following results were obtained in the recovery of gold and silver.

TABLE X.—FLOTATION PRODUCT

| Example number | Element | Percent Distribution of Ag and Au | | |
|---|---|---|---|---|
| | | Cleaned conc. | Cleaner tails | Rougher tails |
| 3 | Au | 53.1 | 42.9 | 4.0 |
| | Ag | 86.7 | 10.5 | 2.8 |
| 5 | Au | 35.2 | 61.4 | 3.4 |
| | Ag | 75.3 | 21.2 | 3.5 |
| 9 | Au | 55.4 | 41.3 | 3.3 |
| | Ag | 86.3 | 10.0 | 3.7 |
| 10 | Au | | | |
| | Ag | 75.4 | 20.7 | 3.9 |

As will be noted from Table X, the combined concentrate and the cleaner tails contain over 95% of the precious metals, about 3 to 4% going to the rougher tails.

The precious metals are easily recoverable from the anode sludge when the anode copper obtained in accordance with the present invention is electrolytically refined.

Summarizing the invention, a method is provided for upgrading the recovery of copper from a copper-iron sulfide ore, such as an ore containing up to about 5% copper. The sulfide ore is first concentrated to a copper level of at least about 15% and, more preferably, to at least about 20% copper.

The concentrate is preferably dead roasted to a sulfur content not exceeding 1% and, generally, not exceeding 0.5%, the roast being carried out to insure that substantially all of the iron present is converted to ferric oxide. Following the initial oxidizing roast, the material is then subjected to a solid state reduction roast at an elevated temperature with a reducing agent in the presence of a small but effective amount of an alkali metal halide, such as sodium chloride or the like halide material. The temperature employed is sufficiently high to effect the selective reduction of copper and form reduced aggregates of metallic copper capable of being recovered by flotation or other methods of concentration to produce a metallic concentrate containing over about 80% metallic copper and even at least about 85% metallic copper. The temperature employed in the segregation-reduction step advantageously ranges from about 650 to 850° C. and, more preferably, about 675° C. to 825° C., in order to assure a metallic concentrate after flotation very low in retained iron, such as below 4% iron. A temperature of approximately 750° C. is particularly preferred in carrying out the solid state reduction roast.

The reducing agent which may be employed in carrying out the reduction reaction preferably is particulate or granular carbon resulting from the use in the process of highly volatile coal. Particulate carbon derived from coke, charcoal, graphite, and the like, of particle size less than 40 mesh has been found suitable. In fact, the carbon may be derived from any suitable carbonaceous material capable of forming particulate carbon in the course of the furnacing treatment. The amount of carbon may range from about 5% to 10%. The halide material, such as sodium chloride, is employed in small but effective amounts, for example, in amounts ranging up to about 2% or more, preferably from about 1% to 2%.

In recovering the reduced metallic copper by flotation, it is preferred that the cleaner tailings obtained be recycled to the initial part of the process, such as by being recycled to the sulfide concentrate before the roasting thereof, or recycled to the solid state reduction step, thus maintaining a closed loop operation in which the copper in the cleaner tailings is maintained in the process by recycling, whereby to produce a highly enriched cleaned metallic concentrate containing over 80% metallic copper capable of being melted and cast into anode electrodes for subsequent refining by electrolysis. This direct method of recovering copper distinguishes over the prior art in the simplicity of operation and in the fact that sulfides high in iron can be treated and still produce a high purity metallic product very low in iron and in which the amount of copper recovered is over 95% and even over 99% of the total copper present in the copper-iron sulfide concentrate.

The invention further distinguishes over the art in the high recovery of precious metals along with the copper. Moreover, the invention provides the additional advantage of enabling the continuous production of effluent gas enriched in $SO_2$ (e.g. 7% by volume and higher) capable of being efficiently recovered by conventional methods in the form of either liquid $SO_2$, elemental sulfur or sulfuric acid, while avoiding air pollution. As stated hereinbefore, it is economically unfeasible to treat effluent gases low in $SO_2$ and, because of this, such gases generally were emitted to the atmosphere.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of recovering copper from a copper-iron sulfide ore which comprises,
   providing from said ore a copper-iron sulfide concentrate containing by weight about 15% to 45% copper, about 15% to 40% of iron, about 20% to 45% of sulfur and the balance essentially gangue material, dead roasting said concentrate to remove the sulfur therein to a level not exceeding about 1%, subjecting the roasted concentrate to a solid state segregation reduction roast at a controlled elevated temperature of about 650° C. to 850° C. with a reducing agent of particulate carbonaceous material in the presence of a small but effective amount of an alkali metal halide to form a segregated product of reduced copper deposited on said particulate carbonaceous material as nuclei and in the form of aggregates mixed with gangue and iron oxide, and then separating said segregated copper product from said gangue and iron oxide, said segregated copper product assaying at least about 80% copper by weight.

2. A method of recovering copper from a copper-iron sulfide ore containing up to about 5% copper which comprises, concentrating said sulfide ore to produce a sulfide conconcerate containing by weight about 15% to 45% copper, about 15% to 40% iron, about 20% to 45% sulfur and the balance essentially gangue material, dead roasting said concentrate to remove substantially all of the sulfur to a level not exceeding about 1%, said sulfur being removed in the form of an effluent gas enriched in $SO_2$, subjecting the roasted concentrate to a solid state segregation reduction roast by mixing said roasted concentrate with particulate carbonaceous material and heating it to a controlled elevated temperature of about 675° C. to 825° C. in the presence of a small but effective amount of an alkali metal halide to form a segregated product of reduced copper particles deposited on said particulate carbonaceous material as nuclei and in the form of aggregates mixed with gangue and iron oxide recoverable by flotation, and then separating said segregated copper product from said gangue and iron oxide by subjecting said reduced concentrate to flotation selective to the recovery of copper to recover the reduced copper as a high grade metallic product assaying at least about 80% copper.

3. The method of claim 2, wherein the $SO_2$ is recovered from the effluent gas in the form of at least one of the products selected from the group consisting of liquid $SO_2$, elemental sulfur and sulfuric acid.

4. A method of upgrading the recovery of copper from a copper-iron sulfide ore containing precious metals, containing up to about 5% copper and also containing gangue material, which comprises, concentrating said sulfide ore to provide a concentrate containing about 15% to 45% copper, about 15% to 40% iron, about 20% to 45% sulfur, substantially all of the precious metals and the balance essentially gangue material, dead roasting said concentrate to remove substantially all of the sulfur to a level not exceeding 1% and to convert the iron to a ferric oxide,
said sulfur being removed in the form of an effluent gas enriched in $SO_2$, mixing said roasted concentrate with particulate carbonaceous material and a small but effective amount of sodium chloride, subjecting said mixed roasted concentrate to a solid state segregation reduction roast at a controlled elevated reducing temperature of about 650° C. to 850° C. to form a segregated product of reduced copper particles deposited on said particulate carbonaceous material as nuclei and in the form of aggregates mixed with gangue and iron oxide recoverable by flotation, and then separating said segregated copper product from said gangue and iron oxide by subjecting said reduced concentrate to flotation selective to the recovery of copper, to recover the reduced copper as a high grade metallic product assaying at least about 80% copper with substantially all of the precious metals.

5. The method of claim 4, wherein the sulfide concentrate prior to roasting contains 18% to 32% copper, about 20% to 35% iron and about 25% to 40% sulfur.

6. The method of claim 4, wherein the controlled temperature of the solid state reduction roast ranges from about 675° C. to 825° C.

7. The method of claim 6, wherein the controlled temperature of the solid state reduction roast is approximately 750° C.

8. The method of claim 4, wherein the amount of carbon employed ranges from about 5% to 10% by weight of the roasted concentrate and wherein the small but effective amount of sodium chloride ranges up to about 2%.

9. The method of claim 4, wherein the $SO_2$ is recovered from the effluent gas in the form of at least one of the products selected from the group consisting of liquid $SO_2$, elemental sulfur and sulfuric acid.

10. The method of claim 4, wherein the flotation is carried out to produce a rougher concentrate and a rougher tailings, said rougher tailings being discarded, and wherein said rougher concentrate is further subjected to at least one additional flotation to produce a cleaned concentrate and at least one cleaner tailings.

11. The method of claim 10, wherein the at least one cleaner tailings is recycled to and mixed with the sulfide concentrate for additional roasting.

12. The method of claim 10, wherein the at least one cleaner tailings is recycled to and mixed with the roasted concentrate for treatment in the solid state reduction step.

13. A continuous method of upgrading the recovery of copper from a copper-iron sulfide ore containing precious metals, containing up to about 5% copper, and also containing gangue material which comprises, concentrating said sulfide ore to provide a concentrate containing about 15% to 45% copper, about 15% to 40% iron, about 20% to 45% sulfur, substantially all of the precious metals, and the balance essentially gangue material, dead roasting said concentrate to remove substantially all of the sulfur to a level not exceeding 1% and to convert the iron to ferric oxide,
said sulfur being removed in the form of an effluent gas enriched in $SO_2$, mixing said roasted concentrate with granulated carbon of minus 40 mesh and a small but effective amount of sodium chloride, subjecting said mixed roasted concentrate to a solid state segregation reduction roast at a controlled temperature of about 650° C. to 850° C. to form a segregated product of reduced copper particles deposited on carbon nuclei and in the form of copper aggregates mixed with gangue and iron oxide recoverable by flotation, separating said segregated copper product from said gangue and iron oxide by subjecting said reduced concentrate to flotation selective to the recovery of copper whereby to produce a rougher concentrate and a rougher tailings, further subjecting said rougher concentrate to at least one additional flotation step to produce at least one cleaner tailings and a high grade cleaned concentrate containing at least about 80% of metallic copper with substantially all of the precious metals contained therein, recycling said at least one cleaner tailings to either the sulfide concentrate prior to roasting or to the roasted concentrate prior to the solid state reduction roast, and continuing the cycle of treating sulfide concentrate and recycling the cleaner tailings whereby to produce a high grade copper product assaying at least about 80% of metallic copper and less than about 4% iron.

14. The method of claim 13, wherein the cleaned concentrate is thereafter melted and cast to form a copper product containing over about 95% copper amenable to electrolytic refining.

15. The method of claim 13, wherein the temperature of the solid state reduction roast ranges from about 675° C. to 825° C.

16. The method of claim 15, wherein the temperature of the solid state reduction roast is approximately 750° C.

17. The method of claim 13, wherein the amount of carbon employed ranges from about 5% to 10% by weight of the roasted concentrate and wherein the small but effective amount of sodium chloride ranges up to about 2%.

18. The method of claim 14, wherein the cast copper product is electrolytically refined to form pure copper and an anode sludge containing substantially all of the precious metals.

19. The method of claim 13, wherein the $SO_2$ is recovered from the effluent gas in the form of at least one of the products liquid $SO_2$, elemental sulfur and sulfuric acid.

References Cited

UNITED STATES PATENTS

| Number | Date | Name | Class |
|---|---|---|---|
| 1,480,212 | 1/1924 | Lamothe | 75—82 |
| 3,589,892 | 6/1971 | Peterson | 75—72 |
| 3,669,646 | 6/1972 | Cullom | 75—72 |
| 1,679,337 | 7/1928 | Moulden | 75—72 |
| 3,524,802 | 8/1970 | Clevenger | 75—117 R UX |
| 3,148,974 | 9/1964 | Rampacek | 75—72 |
| 1,999,209 | 4/1935 | Queneau | 75—113 X |
| 3,466,168 | 9/1969 | Fletcher et al. | 75—113 X |
| 3,490,899 | 1/1970 | Krivsky et al. | 75—117 X |
| 3,300,299 | 1/1967 | Plint | 75—72 |

FOREIGN PATENTS

| Number | Date | Country | Class |
|---|---|---|---|
| 21,063 | 7/1929 | Australia | 75—2 |

OTHER REFERENCES

Rampacek et al.: "Treating Oxidized and Mixed-Sulfide Copper Ores by the Segregation Progress"; in Bureau of Mines Report of Investigations, 5501, 1959 (pp. 1–6, 10, 12–15, 19–21, 24).

ALLEN B. CURTIS, Primary Examiner

U.S. Cl. X.R.

75—113, 117